(12) United States Patent
Rubinstein et al.

(10) Patent No.: US 10,298,534 B2
(45) Date of Patent: *May 21, 2019

(54) ASSOCIATING AN INDICATION OF USER EMOTIONAL REACTION WITH CONTENT ITEMS PRESENTED BY A SOCIAL NETWORKING SYSTEM

(71) Applicant: Facebook, Inc., Menlo Park, CA (US)

(72) Inventors: Yigal Dan Rubinstein, Los Altos, CA (US); Abhishek Doshi, London (GB); Reshma Khilnani Ebberson, San Francisco, CA (US); Cole Gleason, Urbana, IL (US)

(73) Assignee: Facebook, Inc., Menlo Park, CA (US)

( * ) Notice: Subject to any disclaimer, the term of this patent is extended or adjusted under 35 U.S.C. 154(b) by 543 days.

This patent is subject to a terminal disclaimer.

(21) Appl. No.: 14/555,506

(22) Filed: Nov. 26, 2014

(65) Prior Publication Data

US 2015/0088699 A1    Mar. 26, 2015

Related U.S. Application Data

(63) Continuation of application No. 13/842,705, filed on Mar. 15, 2013, now Pat. No. 8,918,339.

(51) Int. Cl.
*G06Q 40/00* (2012.01)
*H04L 12/58* (2006.01)
(Continued)

(52) U.S. Cl.
CPC .............. *H04L 51/32* (2013.01); *G06F 3/041* (2013.01); *G06F 3/048* (2013.01); *G06F 3/0482* (2013.01);
(Continued)

(58) Field of Classification Search
CPC ....................................................... G06Q 40/00
(Continued)

(56) References Cited

U.S. PATENT DOCUMENTS 6,975,304 B1    12/2005  Hawkins et al.
7,080,139 B1     7/2006  Briggs et al.
(Continued)

OTHER PUBLICATIONS

United States Office Action, U.S. Appl. No. 13/842,705, dated Apr. 9, 2014, fifteen pages.

*Primary Examiner* — Bruce I Ebersman
(74) *Attorney, Agent, or Firm* — Fenwick & West LLP

(57) ABSTRACT

A social networking system user may associate a graphical element representing the user's emotional reaction with a content item presented by the social networking system. The user is presented with one or more graphical elements maintained by the social networking system and selects a graphical element for associating with the content item. If certain graphical elements are selected, the social networking system prompts the user for compensation or requests compensation from an entity associated with the selected graphical element. The selected graphical element is associated with the content item and a connection, or other information, between the user and the object identifying the selected graphical element is stored by the social networking system. The selected graphical element may be displayed with the content item to the user and to other users connected to the user.

19 Claims, 9 Drawing Sheets

(51) Int. Cl.
*G06Q 50/00* (2012.01)
*G09G 5/00* (2006.01)
*G06F 3/041* (2006.01)
*G06F 3/048* (2013.01)
*G06F 15/16* (2006.01)
*G06Q 10/10* (2012.01)
*G06F 3/0482* (2013.01)
*G06Q 30/06* (2012.01)

(52) U.S. Cl.
CPC .............. *G06F 15/16* (2013.01); *G06Q 10/10* (2013.01); *G06Q 30/0643* (2013.01); *G06Q 40/00* (2013.01); *G06Q 50/01* (2013.01); *G09G 5/00* (2013.01); *Y10S 715/977* (2013.01)

(58) Field of Classification Search
USPC .......................................................... 705/27
See application file for complete search history.

(56) References Cited

U.S. PATENT DOCUMENTS

| | | | |
|---|---|---|---|
| 7,124,164 | B1 | 10/2006 | Chemtob |
| 7,159,008 | B1 | 1/2007 | Wies et al. |
| 7,363,591 | B2 | 4/2008 | Goldthwaite et al. |
| 7,548,755 | B2 | 6/2009 | Kim |
| 7,647,560 | B2 | 1/2010 | Macauley et al. |
| 7,685,237 | B1 | 3/2010 | Weaver et al. |
| 7,710,916 | B2 | 5/2010 | Kyung et al. |
| RE41,450 | E | 7/2010 | Briggs et al. |
| 8,250,144 | B2 | 8/2012 | Blattner et al. |
| 8,255,810 | B2 * | 8/2012 | Moore et al. .................. 715/752 |
| 8,315,652 | B2 | 11/2012 | Grant et al. |
| 8,346,753 | B2 | 1/2013 | Hayes |
| 8,402,378 | B2 | 3/2013 | Blattner et al. |
| 8,452,307 | B1 | 5/2013 | Fujisaki |
| RE44,324 | E | 6/2013 | Briggs et al. |
| 8,554,861 | B2 | 10/2013 | Christie et al. |
| 8,584,031 | B2 | 11/2013 | Moore et al. |
| 8,633,895 | B2 | 1/2014 | Choi et al. |
| 8,918,339 | B2 * | 12/2014 | Rubinstein et al. ............ 705/39 |
| 9,070,141 | B2 | 6/2015 | Hua et al. |
| 10,120,877 | B2 * | 11/2018 | Heath ................... G06Q 30/02 |
| 10,127,563 | B2 * | 11/2018 | Heath ................... G06Q 30/02 |
| 2002/0077135 | A1 | 6/2002 | Hyon |
| 2004/0140995 | A1 | 7/2004 | Goldthwaite et al. |
| 2005/0069852 | A1 | 3/2005 | Janakiraman et al. |
| 2005/0078804 | A1 | 4/2005 | Yomoda |
| 2005/0095569 | A1 | 5/2005 | Franklin |
| 2005/0108329 | A1 | 5/2005 | Weaver et al. |
| 2005/0144237 | A1 | 6/2005 | Heredia et al. |
| 2005/0156873 | A1 | 7/2005 | Walter et al. |
| 2005/0179654 | A1 | 8/2005 | Hawkins et al. |
| 2005/0204309 | A1 | 9/2005 | Szeto |
| 2005/0223328 | A1 | 10/2005 | Ashtekar et al. |
| 2005/0239450 | A1 | 10/2005 | Wesby |
| 2005/0248574 | A1 | 11/2005 | Ashtekar et al. |
| 2006/0009243 | A1 | 1/2006 | Dahan et al. |
| 2006/0015812 | A1 | 1/2006 | Cunningham et al. |
| 2006/0059160 | A1 | 3/2006 | Smola et al. |
| 2006/0059236 | A1 | 3/2006 | Sheppard et al. |
| 2006/0069736 | A1 | 3/2006 | Czeisler et al. |
| 2006/0193509 | A1 | 8/2006 | Criminisi et al. |
| 2006/0200568 | A1 | 9/2006 | Kim |
| 2006/0212818 | A1 | 9/2006 | Lee |
| 2006/0221059 | A1 | 10/2006 | Choi et al. |
| 2007/0027921 | A1 | 2/2007 | Alvarado et al. |
| 2007/0037573 | A1 | 2/2007 | Kyung et al. |
| 2007/0266090 | A1 | 11/2007 | Len |
| 2008/0040227 | A1 | 2/2008 | Ostermann et al. |
| 2008/0059570 | A1 | 3/2008 | Bill |
| 2008/0114739 | A1 | 5/2008 | Hayes |
| 2008/0182566 | A1 | 7/2008 | Camp, Jr. |
| 2008/0215975 | A1 | 9/2008 | Harrison et al. |
| 2008/0218472 | A1 | 9/2008 | Breen et al. |
| 2008/0244446 | A1 | 10/2008 | Lefevre et al. |
| 2008/0254779 | A1 | 10/2008 | Hwang et al. |
| 2008/0256040 | A1 | 10/2008 | Sundaresan et al. |
| 2008/0278520 | A1 | 11/2008 | Andreasson |
| 2008/0280633 | A1 | 11/2008 | Agiv |
| 2008/0287100 | A1 | 11/2008 | Satheesh et al. |
| 2009/0006418 | A1 | 1/2009 | O'Malley |
| 2009/0012988 | A1 | 1/2009 | Brown |
| 2009/0019117 | A1 | 1/2009 | Bonforte et al. |
| 2009/0027480 | A1 | 1/2009 | Choi |
| 2009/0055484 | A1 | 2/2009 | Vuong et al. |
| 2009/0096782 | A1 | 4/2009 | Lee |
| 2009/0124268 | A1 | 5/2009 | McNamara et al. |
| 2010/0017872 | A1 | 1/2010 | Goertz et al. |
| 2010/0037151 | A1 | 2/2010 | Ackerman et al. |
| 2010/0123724 | A1 | 5/2010 | Moore et al. |
| 2010/0125811 | A1 | 5/2010 | Moore et al. |
| 2010/0131875 | A1 | 5/2010 | Firminger et al. |
| 2010/0177048 | A1 | 7/2010 | Semenets et al. |
| 2010/0217808 | A1 | 8/2010 | Benninger |
| 2010/0235776 | A1 | 9/2010 | Brown |
| 2010/0318202 | A1 | 12/2010 | Baak et al. |
| 2011/0009109 | A1 | 1/2011 | Hyon |
| 2011/0010173 | A1 | 1/2011 | Scott et al. |
| 2011/0045816 | A1 | 2/2011 | Wang et al. |
| 2011/0047508 | A1 | 2/2011 | Metzler et al. |
| 2011/0141919 | A1 | 6/2011 | Singh et al. |
| 2011/0238406 | A1 | 9/2011 | Chen et al. |
| 2011/0246908 | A1 | 10/2011 | Akram et al. |
| 2011/0282646 | A1 | 11/2011 | Bill |
| 2011/0291953 | A1 | 12/2011 | Cheok et al. |
| 2011/0314390 | A1 | 12/2011 | Park et al. |
| 2012/0047447 | A1 | 2/2012 | Haq |
| 2012/0059787 | A1 | 3/2012 | Brown et al. |
| 2012/0060103 | A1 | 3/2012 | Arasaki et al. |
| 2012/0089665 | A1 | 4/2012 | Chung |
| 2012/0113026 | A1 | 5/2012 | Koch |
| 2012/0137367 | A1 | 5/2012 | Dupont et al. |
| 2012/0146955 | A1 | 6/2012 | Martin-Cocher et al. |
| 2012/0162350 | A1 | 6/2012 | Lee et al. |
| 2012/0166532 | A1 | 6/2012 | Hua et al. |
| 2012/0242582 | A1 | 9/2012 | Choi et al. |
| 2012/0249425 | A1 | 10/2012 | Colley |
| 2012/0266077 | A1 | 10/2012 | O'Keefe et al. |
| 2012/0266084 | A1 | 10/2012 | Liao et al. |
| 2013/0024781 | A1 | 1/2013 | Douillet et al. |
| 2013/0031475 | A1 | 1/2013 | Maor et al. |
| 2013/0080927 | A1 | 3/2013 | Weaver et al. |
| 2013/0103766 | A1 | 4/2013 | Gupta |
| 2013/0131880 | A1 | 5/2013 | Lee |
| 2013/0151508 | A1 | 6/2013 | Kurabayashi et al. |
| 2013/0232156 | A1 | 9/2013 | Dunn et al. |
| 2014/0071054 | A1 | 3/2014 | Koch et al. |
| 2014/0143682 | A1 | 5/2014 | Druck |
| 2014/0156360 | A1 | 6/2014 | Shalita et al. |
| 2014/0156566 | A1 | 6/2014 | Kabiljo et al. |
| 2014/0156744 | A1 | 6/2014 | Hua et al. |

\* cited by examiner

ASSOCIATING AN INDICATION OF USER EMOTIONAL REACTION WITH CONTENT ITEMS PRESENTED BY A SOCIAL NETWORKING SYSTEM

CROSS REFERENCE TO RELATED APPLICATIONS

This application is a continuation of co-pending U.S. application Ser. No. 13/842,705, filed Mar. 15, 2013, allowed, which is incorporated by reference in its entirety.

BACKGROUND

This invention relates generally to social networking systems and in particular to providing an indication of a user's opinion regarding content presented by a social networking system.

Social networks, or social utilities that track and enable connections between users (including people, businesses, and other entities), have become prevalent in recent years. In particular, a social network system allows users to more efficiently communicate information to other users of the social networking system. Typically, social networking systems maintain connections among their users and identify content likely to be relevant to their users. Social networking systems also collect and maintain information about their users. Examples of information about users maintained by a social networking system include static information such as geographic location, employer, job type, age, music preferences, and interests or dynamic information describing user interactions. Additionally, many social networking systems notify a user of actions performed by other users connected to the user.

Performing actions communicated to the social networking system allows social networking system users to interact with each other or with objects maintained by the social networking system. For example, users may post comments to pages associated with other users, view images, view video data, listen to audio data or perform other actions on various objects maintained by the social networking system. Actions performed by a user are frequently distributed to additional users connected to the user who performed the action. When interacting with other users or objects, users may seek to indicate their opinion or emotions toward the objects or users. For example, users may seek to indicate they dislike a post, that a post made them laugh, or that a post made them cry. While users may post written comments expressing opinions towards an object, an action performed by another user, or another user, it is difficult for a user to clearly convey emotion through written comments.

SUMMARY

Embodiments of the invention enable users to convey emotions towards various objects maintained by a social networking system by associating one or more emotion icons ("emoticons" or "emojis") with objects maintained by the social networking system. For example, if a user likes an object in the social networking system, the user associates an emoji representing a thumbs up with the post or if the user dislikes the object, the user associates an emoji representing a thumbs down. The emoji associated with a post are displayed along with the content of the post to other users.

In one embodiment, a user requests to associate an emoji with an object presented to the user by the social networking system. For example, the user requests to associate an emoji with a story included in a newsfeed presented to the user. Based on the request, the social networking system may present the user with one or more emoji to associate with the object, and the user selects an emoji from the presented emoji. In one embodiment, the social networking system prompts the user for payment information to associate a selected emoji with the object. The selected emoji is associated with the object and a connection, or other information, between the user and the object identifying the selected emoji is stored by the social networking system.

Emoji associated with an object may be displayed to other users along with the object. For example, if users have associated multiple emoji with content included in a post, such as a story, one or more of the emoji are displayed along with the content. Additionally, each emoji may be displayed along with an identifier of the user associating the emoji with the post. Further, emoji associated with an object may be used when selecting objects for presentation to a user or for ordering objects presented to a user.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
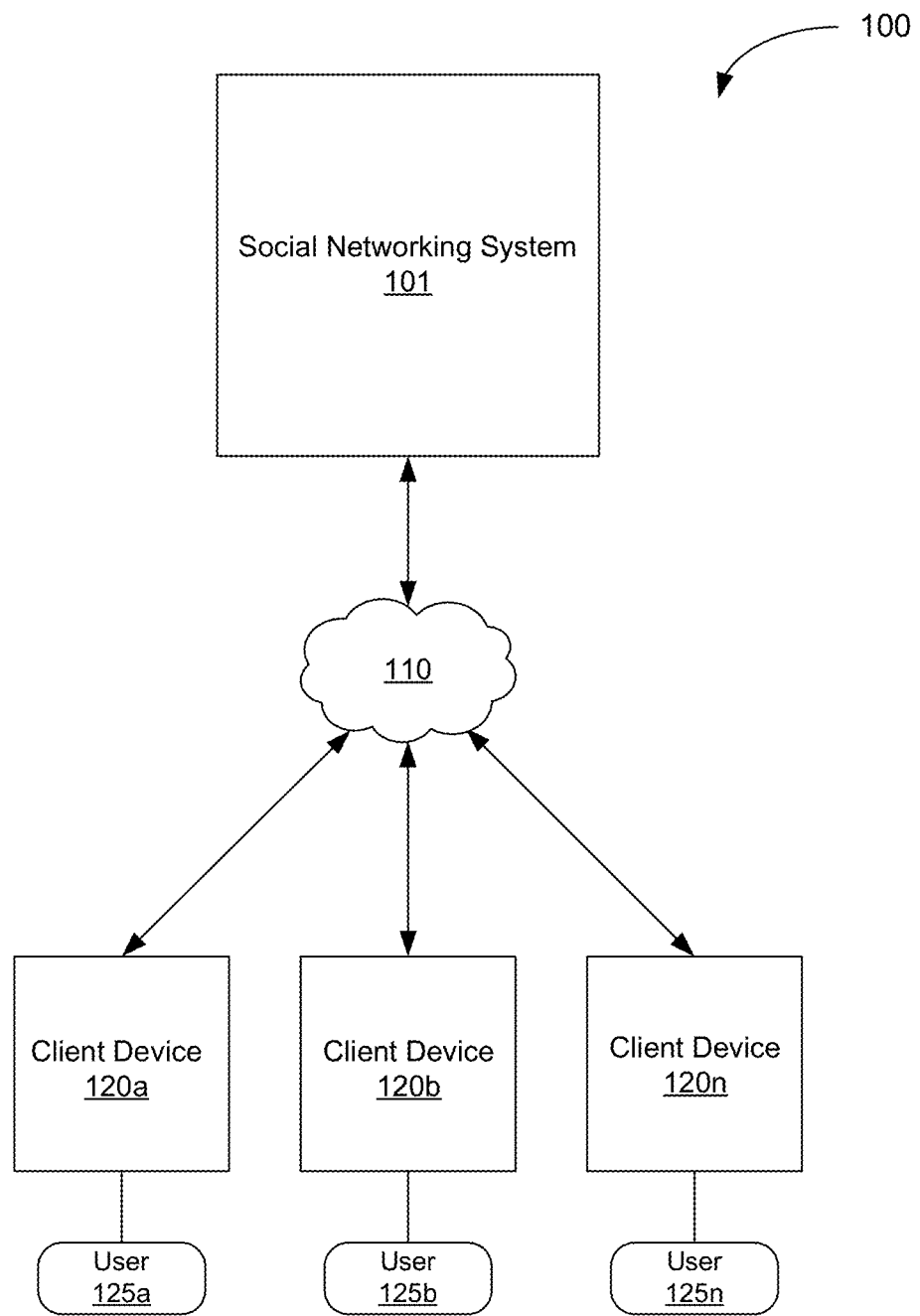
FIG. 1 is a block diagram of a system environment including a social networking system, in accordance with an embodiment of the invention.

FIG. 1 is a block diagram of one embodiment of a system environment 100 including a social networking system 101. The system environment 100 shown by FIG. 1 includes one or more client devices 120*a*, 120*b*, 120*c* (also referred to individually and collectively using reference number "120"), one or more users 125*a*, 125*b*, 125*c* (also referred to individually and collectively using reference number "125"), a social networking system 101, and a network 110. In alternative configurations, different and/or additional components may be included in the system environment 200.

A client device 120 is a device capable of receiving user input as well as transmitting and/or receiving data via the network 110. In one embodiment, a client device 120 is a conventional computer system, such as a desktop or laptop computer. In another embodiment, a client device 120 may be a device having computer functionality, such as a personal digital assistant (PDA), a mobile telephone, a smartphone or a similar device. In one embodiment, a client device 120 executes an application allowing a user 125 using the client device 120 to interact with the social networking system 101. For example, a client device 120 executes a browser application to allow interaction between the client device 120 and the social networking system 101 via the network 110. In another embodiment, a client device 120 interacts with the social networking system 101 through an application programming interface (API) that runs on the native operating system of the client device 120, such as IOS® or ANDROID™.

The client devices 120 are configured to communicate via the network 110, which may comprise any combination of local area and/or wide area networks, using both wired and wireless communication systems. In one embodiment, the network 110 uses standard communications technologies and/or protocols. Thus, the network 110 may include communication channels using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format, such as hypertext markup language (HTML) or extensible markup language (XML). In some embodiments, all or some of the communication links of the network 110 may be encrypted using any suitable technique or techniques.

The social networking system 101 comprises one or more computing devices storing information about users and objects, as well as information describing connections between various users and objects. Additionally, the social networking system 101 may provide content to one or more users based on information about the users maintained by the social networking system 101. In various embodiments, the social networking system 101 is one or more servers accessible by client devices 120 via the network 110. The social networking system 101 is further described below in conjunction with FIG. 2.

Figure 2:
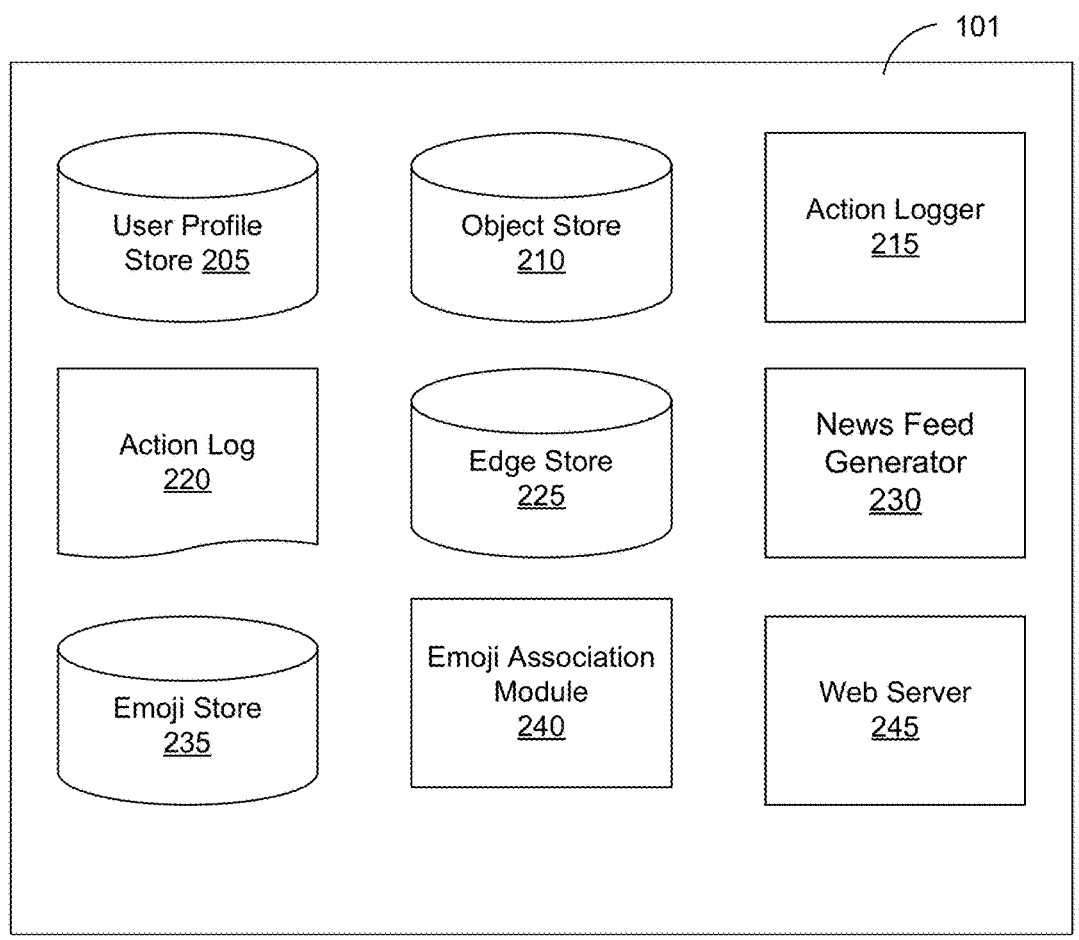
FIG. 2 is a block diagram of a social networking system, in accordance with an embodiment of the invention.

FIG. 2 is a diagram of one embodiment of the social networking system 101. In the embodiment shown by FIG. 2, the social networking system 101 includes a user profile store 205, an object store 210, an action logger 215, an action log 220, an edge store 225, a newsfeed generator 230, an emoji store 235, an emoji association module 240, and a web server 245. In other embodiments, the social networking system 101 may include additional, fewer, or different modules for various applications. Conventional components such as network interfaces, security mechanisms, load balancers, failover servers, management and network operations consoles, and the like are not shown so as to not obscure the details of the system.

Each user of the social networking system 101 is associated with a user profile, which is stored in the user profile store 205. A user profile includes declarative information about the user that was explicitly shared by the user, and may also include profile information inferred by the social networking system 101. In one embodiment, a user profile includes multiple data fields, each data field describing one or more attributes of the corresponding user of the social networking system 101. Examples of information stored in a user profile include biographic, demographic, and other types of descriptive information, such as work experience, educational history, gender, hobbies or preferences, location and the like. A user profile may also store other information provided by the user, for example, images or videos. Further examples of information provided by the user include posts communicated to the social networking system 101 from a client device 120. Posts may include data such as status updates or other textual data, location information, photos, videos, links, music or other similar data and/or media and are associated with the user profile of the posting user. In certain embodiments, images of users may be tagged with identification information of users of the social networking system 101 displayed in an image. A user profile in the user profile store 205 may also maintain references to actions by the corresponding user performed on content items in the object store 210 and stored in the action log 220.

The object store 210 stores objects each representing various types of content. For example, the object store 235 stores a data structure including data for each object having information fields describing characteristics of the objects. Different data structures may be stored for different types of objects. For example, for event type objects, the object store 235 includes data structures specifying the time and location for an event. When a new object of a particular type is created, the social networking system 101 initializes a new data structure of the appropriate type, assigns a unique object identifier to the data structure, and adds data to the data structure as needed. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 101. In one embodiment, objects in the content store 210 represent single pieces of content, or content "items."

The action logger 215 receives communications about user actions internal to and/or external to the social networking system 101, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 101 to track user actions on the social networking system 101, as well as actions on third party systems that communicate information to the social networking system 101. Users may interact with various objects on the social networking system 101, and information describing these interactions is stored in the action log 220. Examples of interactions with objects include: commenting on posts, sharing links, and checking-in to physical locations via a mobile device, accessing content items, and any other interactions. Additional examples of interactions with objects on the social networking system 101 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 101 as well as with other applications operating on the social networking system 101. In some embodiments, data from the action log 220 is used to infer interests or preferences of a user, augmenting the interests included in the user's user profile and allowing a more complete understanding of user preferences.

The action log 220 may also store user actions taken on a third party system, such as an external website, and communicated to the social networking system 101. For example, an e-commerce website that primarily sells sporting equipment at bargain prices may recognize a user of a social networking system 101 through a social plug-in enabling the e-commerce website to identify the user of the social networking system 101. Because users of the social networking system 101 are uniquely identifiable, e-commerce websites, such as this sporting equipment retailer, may communicate information about a user's actions outside of the social networking system 101 to the social networking system 101 for association with the user. Hence, the action log 220 may record information about actions users perform on a third party system, including webpage viewing histories, advertisements that were engaged, purchases made, and other patterns from shopping and buying.

In one embodiment, the edge store 225 stores information describing connections between users and other objects on the social networking system 101 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 101, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 101, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 101 over time to approximate a user's interest in an object, interest, and other users in the social networking system 101 based on the actions performed by the user. A user's affinity may be computed by the social networking system 101 over time to approximate a user's interest for an object, interest, or other user in the social networking system 101 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Data stored in the user profile store 205, the object store 210, action log 220, and the edge store 225 allows the social networking system 101 to generate a social graph where nodes represent objects or users and edges represent connections between nodes identifying relationships between users and/or objects. An edge between two nodes in the social graph represents a particular kind of connection between the users or objects corresponding to each of the nodes, which may result from an action that was performed by one of the nodes on the other node. Maintaining a social graph allows the social networking system 101 to readily identify relationships between various objects and/or users.

In one embodiment, the social networking system 101 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in the edge store 225 or may select candidate stories included in the object store 210. One or more of the candidate stories are selected and presented to a user by the newsfeed manager 230.

For example, the newsfeed manager 230 receives a request to present one or more stories to a social networking system user. The newsfeed manager 230 accesses one or more of the user profile store 205, the object store 210, the action log 220, and the edge store 225 to retrieve information about the identified user. For example, stories or other data associated with users connected to the identified user are retrieved. The retrieved stories or other data are analyzed by the newsfeed manager 230 to identify content likely to be relevant to the identified user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 205. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, newsfeed manager 230 may analyze stories received by social networking system 101 from various users to obtain information about user preferences or actions from the analyzed stories. This information may be used to refine subsequent selection of stories for newsfeeds presented to various users.

In one embodiment, the social networking system 101 includes an emoji store 235 including information describing icons or images representing various emotional states or other information. These icons or images are referred to herein as "emoji." Emoji may be static images or may be animated images. For example, an emoji may include a cartoon character crying including a pair of animated tears coming out of the character's eyes. The emoji store 235 includes data describing various emoji and may include additional information such as pricing or availability of some emoji. In one embodiment, information describing the emoji is included in the object store 210.

In one embodiment, a group of emoji are available to users for free, while additional emoji may be obtained by the user by providing compensation to the social networking system 101. For example, a basic set of emoji are available for free, while more complex or detailed emoji may be acquired in exchange for compensation to the social networking system 101. For example a basic set of emoji are static images while premium emojis are animated images. In other embodiments a user provides compensation to the social networking system 101 before having access to any emoji; alternatively, all emoji in the emoji store 235 are accessible without providing compensation to the social networking system 101.

In one embodiment, compensating the social networking system 101 allows a user to associate an emoji with objects a limited number of times or for a limited period of time. In other embodiments, compensating the social networking system 101 allows the user to associate the emoji with objects for an unlimited length of time or an unlimited number of times. For example, compensating the social networking system 101 allows the user to associate an emoji with a limited number of objects. A user may compensate the social networking system 101 to associate a set, or bundle, of emoji with objects. For example, a user may purchase association of 5 emojis with objects for 5 dollars. In other embodiments, the social networking system 101 provides users with access to emoji through a subscription, where the user compensate the social networking system 101 at specified intervals to associate various emoji with objects. For example, a user provides the social networking system 101 with a monthly fee of 5 dollars to associate up to 10 emoji with objects per month. In both embodiments, the emojis made available to the user may be single use emojis, limited time use emojis, limited time period emojis, or unlimited usage emojis.

In some embodiments, an emoji subscription allows a user to associate any emoji covered by the subscription with one or more objects an unlimited number of times while the subscription is valid. This allows a user to associate emojis from a specific category or group with objects. For example, the social networking system 101 offers a subscription providing users with access to emoji related to a specific cartoon character and allowing users purchasing the subscription to associate any emoji related to the cartoon character with objects for the duration of the subscription. In one embodiment, the subscription allows the user to access newly added emoji related to the category or group encompassed by the subscription.

One or more emojis included in the emoji store 235 may be are sponsored or subsidized by advertisers or other entities. In one embodiment, access to sponsored emoji is limited to users having a connection with the advertiser or entity via the social networking system 101. For example, a movie production studio may sponsor emojis featuring characters from a movie that is about to be released or that has been recently released. Users connected to a page in the social networking system associated with the movie or with the movie production studio may have access to associate the sponsored emoji with objects. The entity sponsoring emojis may compensate the social networking system 101 when a user connected to the sponsoring entity associates a sponsored emoji with an object. In other embodiments, an entity may provide a portion of the compensation to the social networking system 101 when a user associates an emoji sponsored by the entity with an object while the user provides another portion of the compensation to the social networking system 101.

External systems, such as external websites, may provide emoji to the social networking system 101 for storage in the emoji store 235. An external system may specify the amount of compensation to be received by the social networking system 101 to allow a user to associate emoji from the external system with posts. The social networking system 101 may receive the compensation and communicate the received compensation to the external system. In some embodiments, the social networking system 101 charges an additional fee to the user for associating emoji with objects or charges the external system a fee for providing emoji to users. Hence, the social networking system 101 may retain a portion of the compensation provided by a user for associating emoji provided by an external publisher with objects.

The emoji association module 240 receives requests from users to associate emoji with objects maintained by the social networking system 101 and associates emoji selected by a user with an object. When the emoji association module 240 receives a request to associate emoji with an object, the emoji association module 240 presents one or more emoji from the emoji store 235 to the user. When a user selects an emoji, the emoji association module determines if compensation is to be received to associate the selected emoji with an object and obtains payment information from the user if compensation is to be received. The emoji association module 240 also stores a connection between the selected emoji, the object, and the user in the edge store 225.

Association of emoji with an object maintained by the social networking system 101 is further described below in conjunction with FIGS. 3 and 4.

The web server 245 links the social networking system 101 via the network 110 to the one or more client devices 120. The web server 245 serves web pages, as well as other content, such as JAVA®, FLASH®, XML and so forth. The web server 245 may receive and route messages between the social networking system 101 and one or more client devices 120, for example, instant messages, queued messages (e.g., email), text and short message service (SMS) messages, or messages sent using any other suitable messaging technique. A user may send a request to the web server 245 to upload information, for example, images or videos that are stored in the object store 210. Additionally, the web server 245 may provide API functionality to send data directly to native client device operating systems, such as IOS®, ANDROID™, or RIM®.

Associating Emoji with Social Networking System Content

Figure 3:
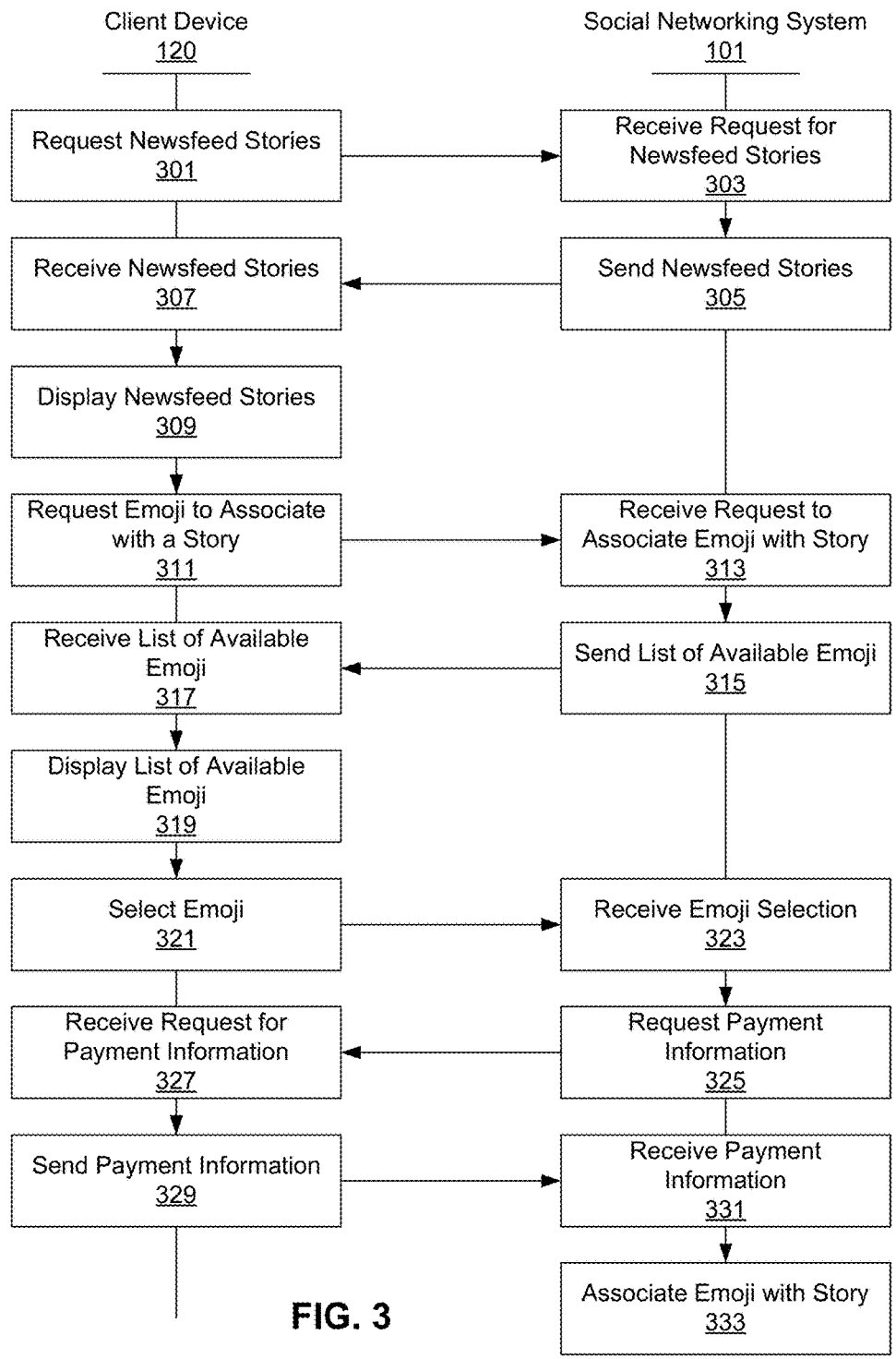
FIG. 3 is an interaction diagram of a method for associating emoji with objects in a social networking system, in accordance with one embodiment of the invention.

FIG. 3 illustrates an interaction diagram of one embodiment of a method for associating emoji with objects maintained by a social networking system 101. For purposes of illustration, FIG. 3 describes associating emoji with a story provided to a user 125 by the social networking system 101. However, emoji may be associated with any object maintained by the social networking system 101 and provided to users 125.

In FIG. 3, a user 125 requests 301 one or more newsfeed stories from the social networking system 101 using a client device 120. When the social networking system 101 receives 303 the request, the newsfeed generator 225 selects one or more newsfeed stories, such as the stories determined to be most relevant to the user 125, and sends 305 the selected stories to the client device 120. Upon receiving 307 the selected stories, the client device 120 displays 309 the selected stories to the user 125.

The user 125 may elect to associate an emoji with one of the displayed stories to indicate the user's opinion or emotion toward the story. To associate an emoji with the story, the user 125 requests 311 emoji accessible to the user. The social networking system 101 receives 313 the request and retrieves emoji available to the user, which are sent 315 to the client device. For example, the social networking system 101 identifies groups of emoji the user has provided compensation to the social networking system 101 for accessing and/or identifies emoji that the user is otherwise enabled to associate with objects. For example, the user accesses an interface element in a story to request emoji from the social networking system 101, and the emoji eligible for use by the user are received 317 from the social networking system 101 and displayed 319 along with the story.

From the displayed emoji, the user selects 321 an emoji to associate with the story, and the social networking system 101 receives 323 an identification of the selected emoji. The social networking system 101 determines if compensation is needed for the user to associate the selected emoji with the story. If the social networking system 101 receives compensation to associate the selected emoji with the story, the social networking system requests 325 payment information from the user 125. The client device 120 receives 317 the request for compensation and prompts the user to provide payment information. Payment information provided by the user 125 to the client device 120 is sent 329 to the social networking system 101. When the social networking system 101 receives 331 the payment information, the social networking system associates 333 the selected emoji with the story. In one embodiment, the emoji is displayed along with the story to the user 125 and additional users connected to the user 125 may be notified that the user 125 associated the selected emoji with the story.

Figure 4:
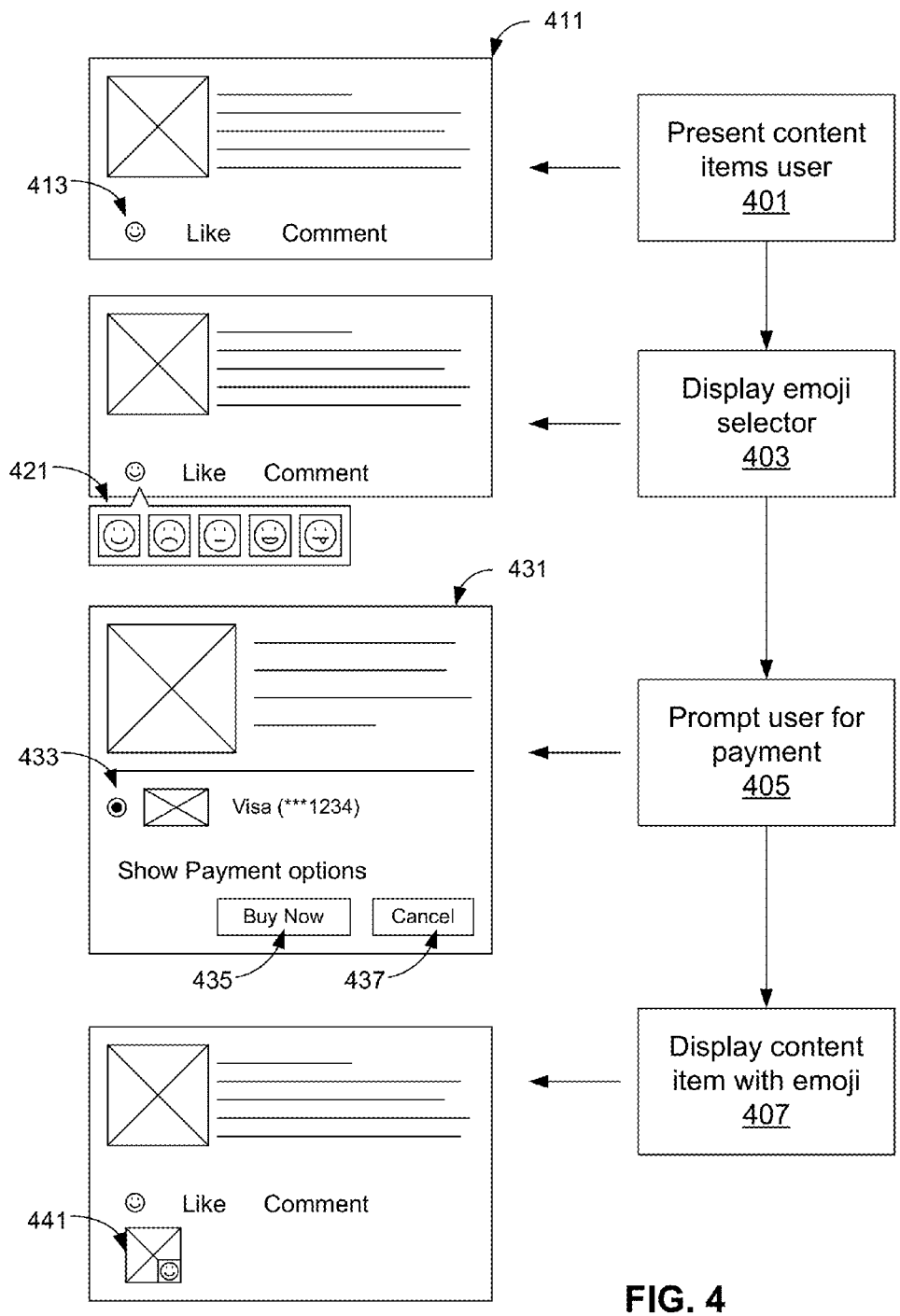
FIG. 4 shows a diagram of a user interface flow for associating emoji with objects in a social networking system, in accordance with one embodiment of the invention.
Figure 5A:
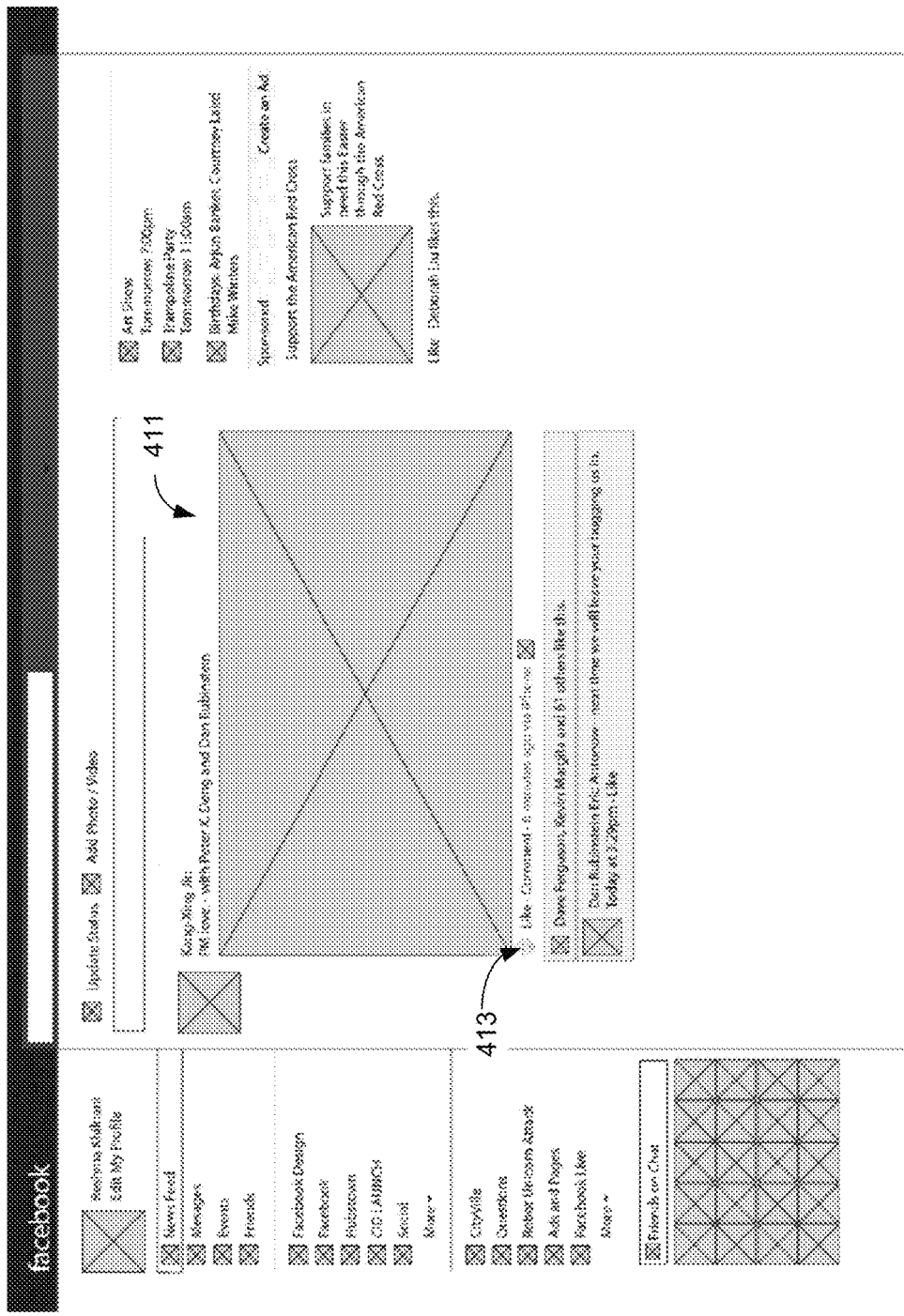
FIG. 5A shows an example user interface displaying a newsfeed story, in accordance with an embodiment of the invention.

FIG. 4 illustrates one embodiment of a user interface flow presented to a viewing user of a social networking system associating an emoji with an object. The viewing user is presented 401 with one or more content items, such as newsfeed stories 411. FIG. 5A shows one example of a newsfeed story 411 presented to the viewing user. One or more of the presented content items includes an interface element 413 for associating an emoji with the content item.

Figure 5B:
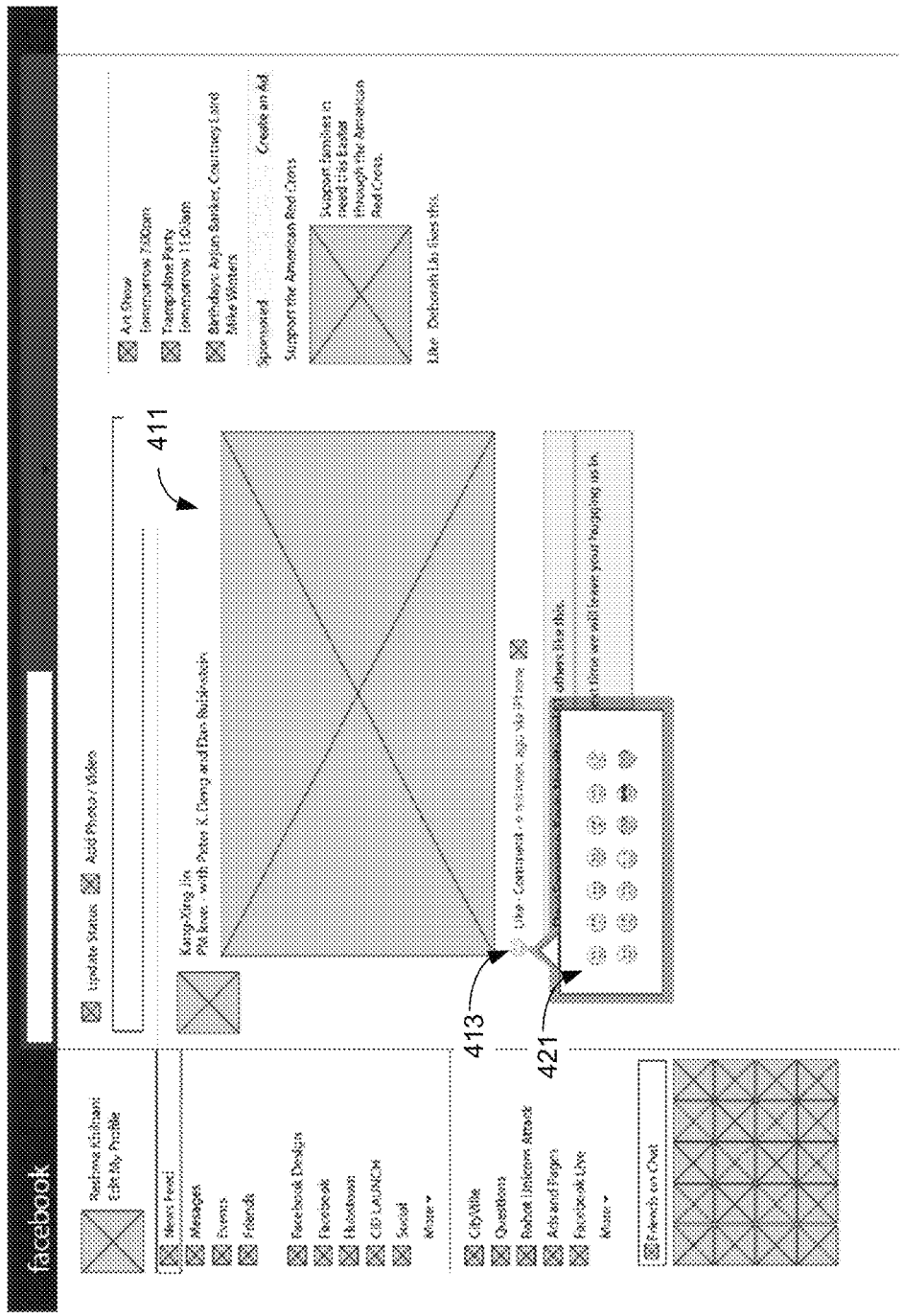
FIG. 5B illustrates a user interface displaying an emoji selector, in accordance with an embodiment of the invention.

When the viewing user interacts with the interface element 413 to associate one or more emoji with a content item, one or more emoji eligible to be selected by the viewing user are displayed 403. In the example shown by FIG. 4, the emoji eligible for selection by the viewing user are displayed 403 in an emoji selector 421, an additional example of which is shown in FIG. 5B. In one embodiment, emoji eligible for selection by the viewing user are displayed in the emoji selector 421 as an array or grid. Alternatively, the emoji selector 421 displays one or more categories or themes, and displays emoji eligible for selection by the viewing user and associated with a selected category or theme. For example, the emoji selector 421 displays a list including smiley face emojis, sad face emojis, and other categories of emoji. The viewing user selects a category of emoji from the list, and the emoji selector 421 displays an array or grid of emoji included in the selected category. In another embodiment, the emoji selector 421 directs the viewing users to a webpage or another source for selecting emoji.

In some embodiments, the emoji selector 421 may present emojis to the viewing user based on the contents of the content item to be associated with an emoji. For example, if a content item includes a positive review of a superhero movie, the emoji selector 421 may display 403 emojis including characters from the superhero movie. Additionally the social networking system 101 may access stored information associated with the viewing user, such as emoji previously associated with content items by the viewing user, and select emoji displayed 403 to the viewing user based on the information associated with the viewing user. The emoji selector 421 may alternatively display 403 a specified number of most frequently selected emoji (e.g., the 10 most popular emojis during the last 7 days).

Figure 5C:
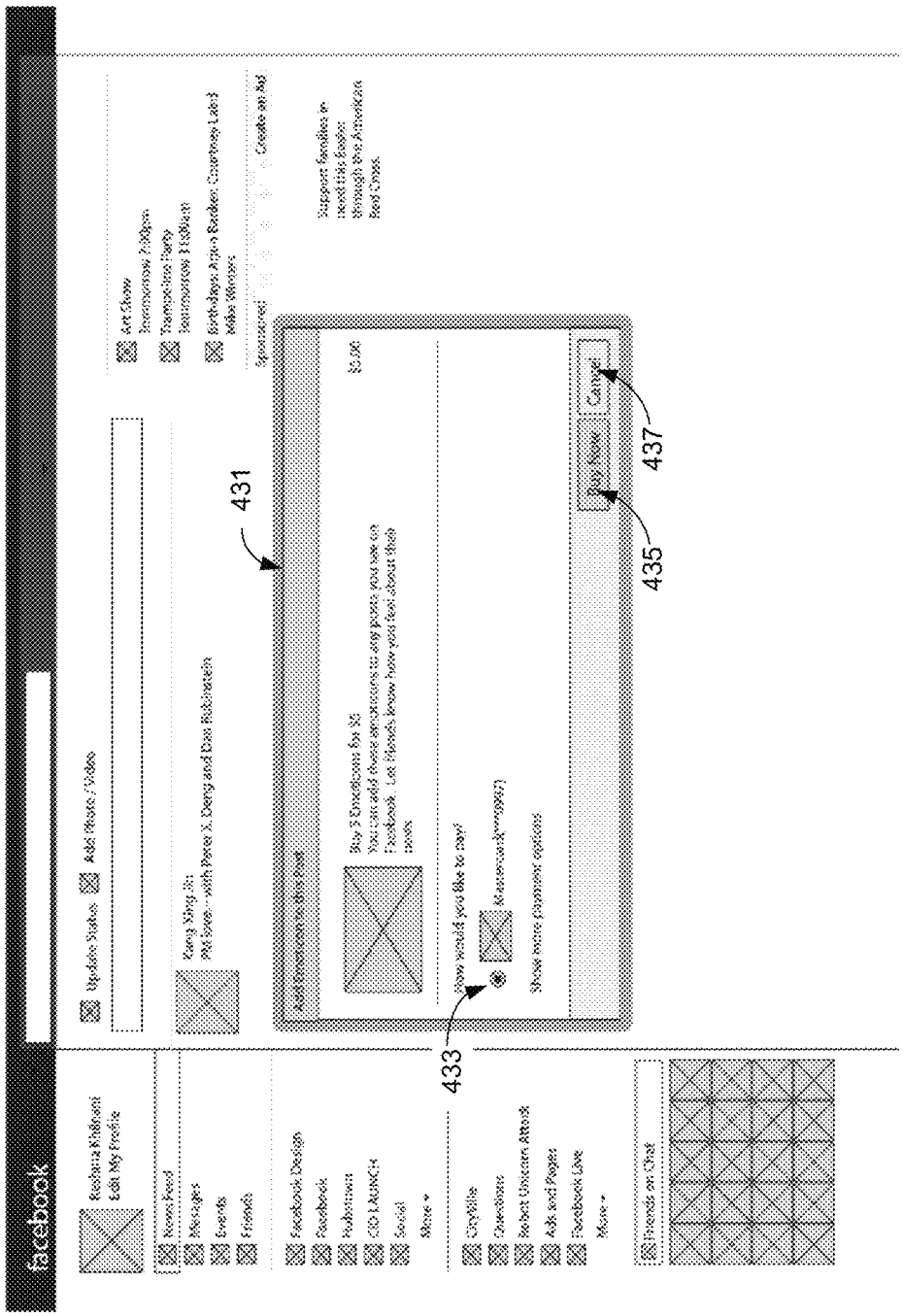
FIG. 5C illustrates a user interface for providing payment information for a selected emoji, in accordance with an embodiment of the invention.

If the viewing user selects an emoji for which compensation is needed to associate the emoji with the content item, the social networking system prompts 405 the viewing user for payment information (e.g., credit card number, bank account number, etc.). FIG. 5C shows an example user interface for the viewing user providing payment information to the social networking system 101. In one embodiment, the social networking system 101 stores previously-received payment information for another emoji and allows the viewing user to select the stored payment information 433. As shown in FIGS. 4 and 5C, the user interface includes an interface element 435 for confirming purchase of the emoji and/or an interface element 437 for cancelling purchase of the emoji.

Figure 5D:
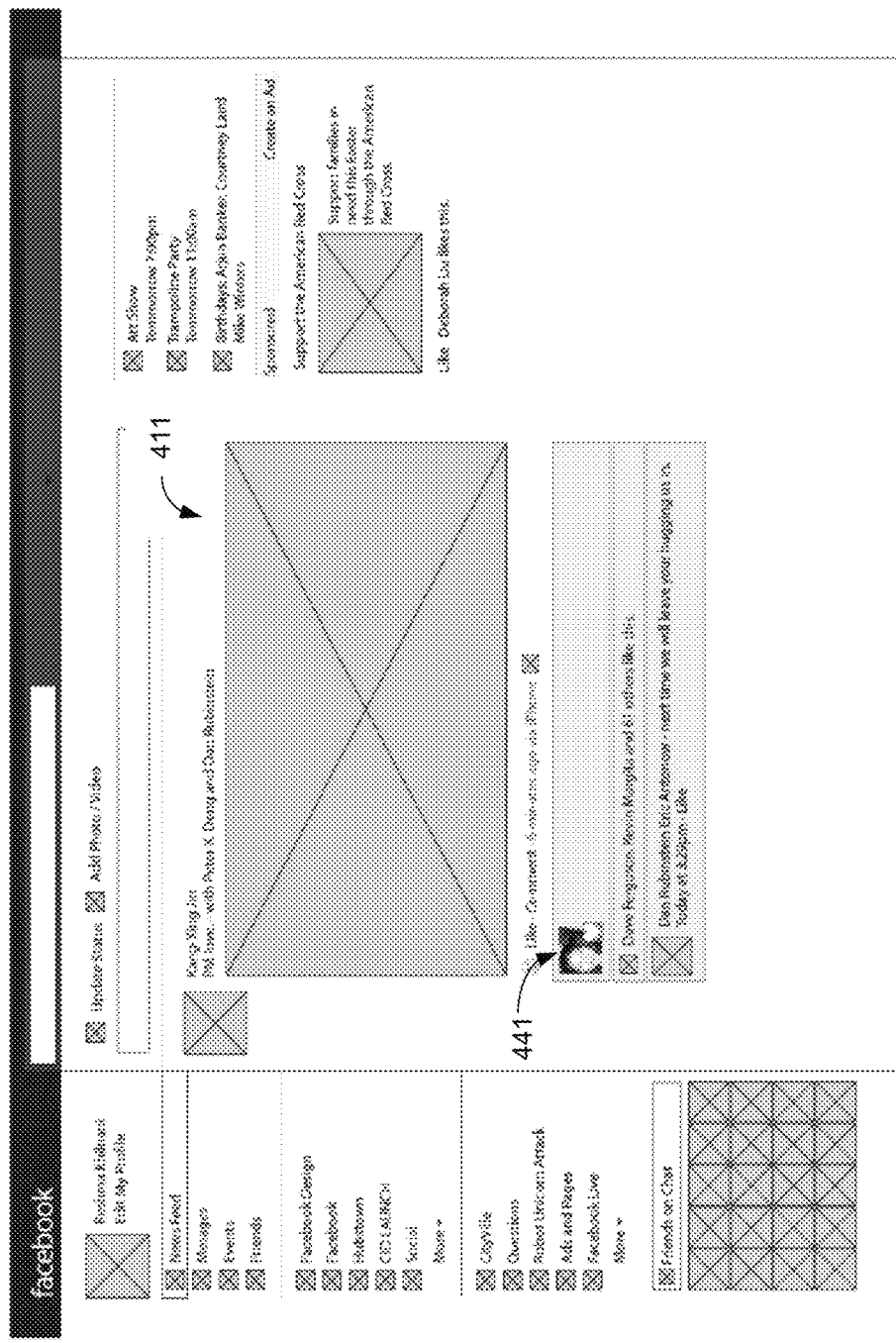
FIG. 5D shows a newsfeed story associated with an emoji, in accordance with an embodiment of the invention.
Figure 5E:
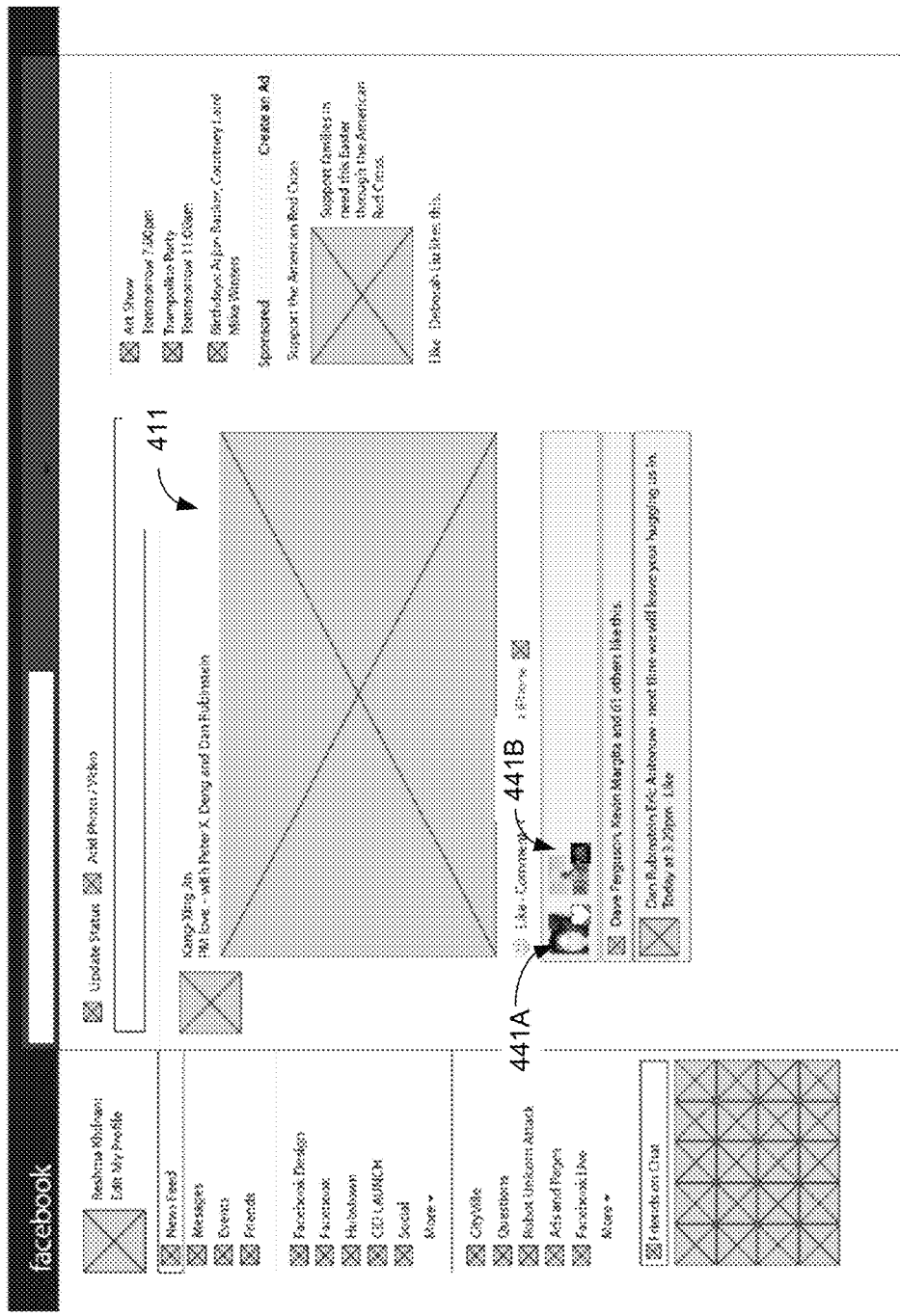
FIG. 5E shows a newsfeed story associated with multiple emojis as gifts, in accordance with an embodiment of the invention.

After receiving payment information from the viewing user, the social networking system displays 407 the selected emoji along with the content item to additional users of the social networking system 101 connected to the viewing user. Information identifying the user associating the emoji with the content item may be displayed along with the emoji in some embodiments. For example, as shown in FIG. 5D, a profile picture of the viewing user associating an emoji with a content item is displayed to users connected to the viewing user along with the content item and emoji FIG. 5E shows an example of a user interface where profile pictures of multiple users associating emoji with a content item are displayed along with the content item and emoji when the content item is viewed by users connected to one or more of the users that associated emoji with the content item.

SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer readable medium configured to store instructions, the instructions when executed by a processor cause the processor to:
   store one or more graphical elements in a social networking system, each graphical element providing a visual representation of an emotional state associated with a user;
   present content items to a viewing user of the social networking system;
   receive a request from the viewing user to associate a graphical element with a selected content item from the presented content items;
   retrieve one or more graphical elements eligible to be used by the viewing user;
   present the retrieved one or more graphical elements to the viewing user;
   receive a selection of a selected graphical element from the one or more graphical elements from the viewing user;
   prompt the viewing user for payment information associated with the selected graphical element;
   associate the selected graphical element with the content item when payment information is received; and
   display the selected graphical element along with the content item to one or more additional users of the social networking system connected to the viewing user and viewing the selected content item.

2. The non-transitory computer readable medium of claim 1, wherein the instructions for retrieving one or more graphical elements eligible to be used by the viewing user cause the processor to:
   retrieve one or more graphical elements for which the social networking system previously received payment information from the viewing user.

3. The non-transitory computer readable medium of claim 2, wherein the instructions for retrieving one or more graphical elements eligible to be used by the viewing user further cause the processor to:
   retrieve one or more graphical elements for which the social networking system does not require payment information.

4. The non-transitory computer readable medium of claim 1, wherein the instructions for associating the selected graphical element with the content item when payment information is received cause the processor to:
   associate the selected graphical element with the content item when a portion of the payment information is received from an entity associated with the selected graphical element and a remaining portion of the payment information is received from the viewing user.

5. The non-transitory computer readable medium of claim 1, wherein the instructions for associating the selected graphical element with the content item when payment information is received cause the processor to:
   associate the selected graphical element with the content item when the payment information is received from an entity associated with the selected graphical element.

6. The non-transitory computer readable medium of claim 1, wherein the instructions for associating the selected graphical element with the content item when payment information is received cause the processor to:

associate the selected graphical element with the content item when the payment information is received from the viewing user.

7. The non-transitory computer readable medium of claim 1, wherein the instructions for displaying the selected graphical element along with the content item to one or more additional users of the social networking system connected to the viewing user and viewing the content item cause the processor to:
display the selected graphical element and an identifier of the viewing user to the one or more additional users of the social networking system connected to the viewing user along with the selected content item.

8. The non-transitory computer readable medium of claim 1, further comprising instructions that when executed by the processor, cause the processor to:
store a connection between the viewing user and the content item, the connection identifying the selected graphical element.

9. The non-transitory computer readable medium of claim 1, wherein the content items comprise one or more stories describing actions of other social networking system users connected to the viewing user.

10. A non-transitory computer readable medium configured to store instructions, the instructions when executed by a processor cause the processor to:
store one or more graphical elements in a social networking system, each graphical element providing a visual representation of an emotional state associated with a user;
present content items to a viewing user of the social networking system;
receive a request from the viewing user to associate an graphical element with a selected content item from the presented content items;
retrieve one or more graphical elements eligible to be used by the viewing user;
identify one or more of the retrieved one or more graphical elements associated with information included in the selected content item;
present the identified one or more graphical elements to the viewing user;
receive a selection of a selected graphical element from the identified one or more graphical elements from the viewing user; and
store information identifying the viewing user, the selected graphical element, and the content item in the social networking system.

11. The non-transitory computer readable medium of claim 10, wherein the instructions for retrieving one or more graphical elements eligible to be used by the viewing user cause the processor to:
retrieve one or more graphical elements for which the social networking system previously received payment information from the viewing user.

12. The non-transitory computer readable medium of claim 11, wherein the instructions for retrieving one or more graphical elements eligible to be used by the viewing user further cause the processor to:
retrieve one or more graphical elements for which the social networking system does not require payment information.

13. The non-transitory computer readable medium of claim 10, further comprising instructions that when executed by the processor, cause the processor to:
display the selected graphical element and an identifier of the viewing user to one or more additional users of the social networking system connected to the viewing user and viewing the selected content item.

14. The non-transitory computer readable medium of claim 10, wherein the instructions for receiving the selection of the selected graphical element from the identified one or more graphical elements from the viewing user cause the processor to:
determine whether to request compensation from the viewing user based on the selected graphical element; and
request payment information from the viewing user if compensation is determined to be requested.

15. A non-transitory computer readable medium configured to store instructions, the instructions when executed by a processor cause the processor to:
store one or more graphical elements in a social networking system, each graphical element providing a visual representation of an emotional state associated with a user;
present one or more content items to a viewing user of the social networking system;
receive a request from the viewing user to associate an graphical element with a selected content item from the presented content items;
present one or more of the stored graphical elements to the viewing user;
receive a selection of a selected graphical element from the presented one or more graphical elements from the viewing user;
associate the selected graphical element with the content item when payment information is received; and
display the selected graphical element along with the content item to one or more additional users of the social networking system connected to the viewing user and viewing the selected content item.

16. The non-transitory computer readable medium of claim 15, wherein the instructions for presenting one or more of the stored graphical elements to the viewing user cause the processor to:
retrieve one or more graphical elements eligible to be used by the viewing user;
select a group of the one or more graphical elements eligible to be used by the viewing user; and
present the group of the one or more graphical elements to the viewing user.

17. The non-transitory computer readable medium of claim 15, wherein the instructions for presenting one or more of the stored graphical elements to the viewing user cause the processor to:
retrieve one or more graphical elements for which the social networking system previously received payment information from the viewing user.

18. The non-transitory computer readable medium of claim 17, wherein the instructions for presenting one or more of the stored graphical elements to the viewing user further cause the processor to:
retrieve one or more graphical elements for which the social networking system does not require payment information.

19. The non-transitory computer readable medium of claim 15, wherein the instructions for receiving the selection of the selected graphical element from the presented one or more graphical elements from the viewing user cause the processor to:
determine whether the social networking system requires compensation to associate the selected graphical element with the content item; and responsive to determining the social networking system requires compensation to associate the selected graphical element with the content item, request payment information from the viewing user.

* * * * *